C. MYERS & W. GUMMOW.
Improvement in Sub-Soil Plows.
No. 133,167.                                   Patented Nov. 19, 1872.
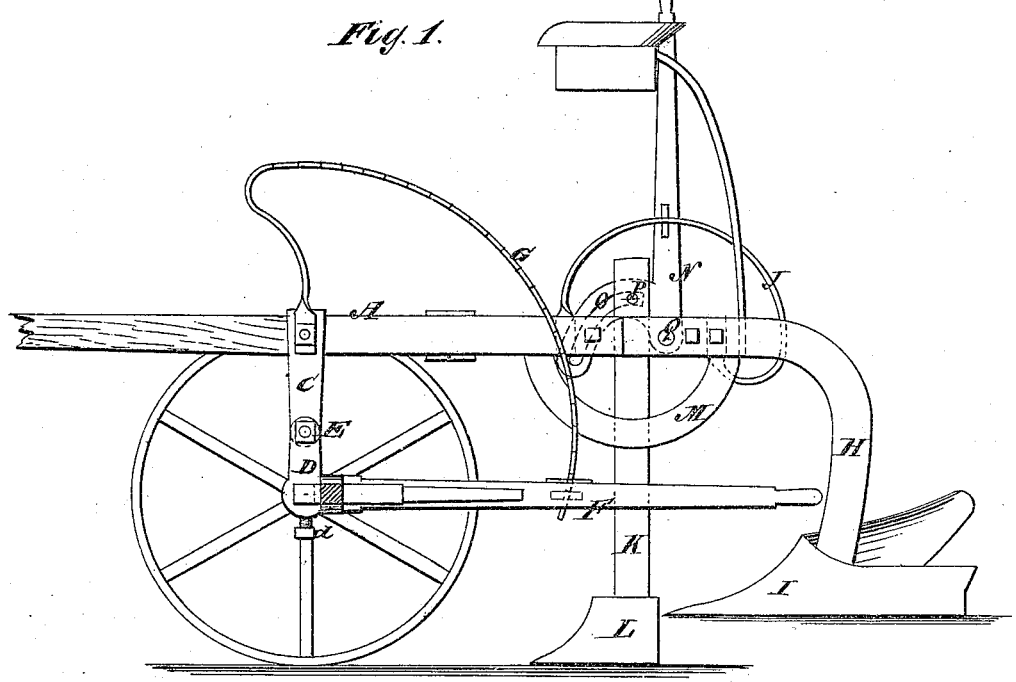
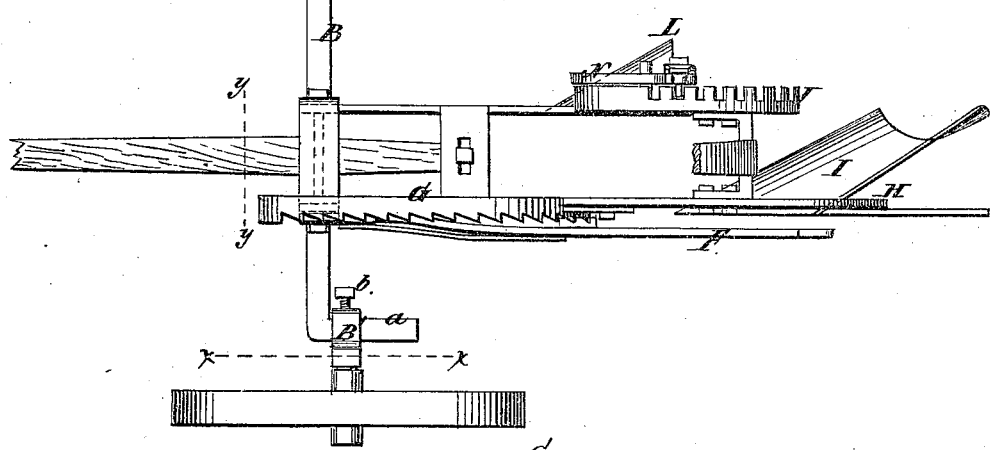
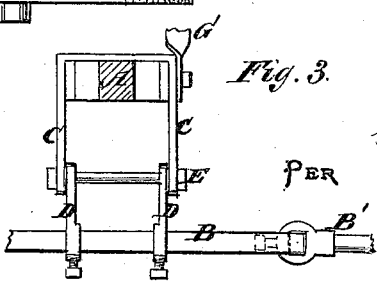
Witnesses:
E. Wolff
C. Sedgwick
Inventor:
C. Myers &
Wm. Gummow
per
———
Attorneys.

UNITED STATES PATENT OFFICE.

CHRISTIAN MYERS AND WILLIAM GUMMOW, OF MARYSVILLE, CALIFORNIA.

IMPROVEMENT IN SUBSOIL-PLOWS.

Specification forming part of Letters Patent No. 133,167, dated November 19, 1872.

*To all whom it may concern:*

Be it known that we, CHRISTIAN MYERS and WILLIAM GUMMOW, of Marysville, in the county of Yuba and State of California, have invented a new and useful Improvement in Gang Subsoil-Plows, of which the following is a specification:

The invention consists in the mode of adjusting the subsoil-plow.

Figure 1 is a longitudinal sectional elevation of our improved gang-plow taken on line $x\ x$ of Fig. 1; Fig. 2 is a plan view; and Fig. 3 is a transverse section on the line $y\ y$ of Fig. 2.

Similar letters of reference indicate corresponding parts.

A is the frame, which is supported on the axle B by the arms C D, jointed together at E to allow of turning the said axle to raise or lower the frame as required, for which, also, for holding the axle and the arms D in any required position, the long lever F, projecting rearward from the axle, and the curved catch-bar G on the frame, are provided and arranged as shown. The standard H for the rearmost plow I, which is a common top-soil plow, is a permanent extension of the frame, suitably curved downward for the purpose. The standard K for the subsoil-plow L is a straight bar, which is fitted to slide up and down in suitable guides and supports on the brace M and the side of the frame A. It is raised, lowered, and held in position by the cranked lever N, with a cam-slot, O, in its short arm, through which a stud-pin, P, on said bar K projects, the said lever being pivoted to the frame and held by a curved notched bar, J, at Q, and so arranged that, by moving the vertical long arm forward and back, the eccentrically-slotted short arm will force the bar up or down. By this contrivance the subsoil-plow is shifted independently of the other one.

We propose to have the cranked axle so that we may vary its sweep to adjust it suitably for deep or shallow plowing, and therefore we make it in two parts, B and B', the former being the principal part, with the cranked part $a$ at one end, which we connect with the latter by having said part $a$ pass through a hole in B' transversely to the long axis and fastened by a set-screw, $b$, by which the sweep of the crank can be readily lengthened or shortened. The subsoil-plow is mounted in advance of the other, and as far to the right as is necessary to have it run in the furrow previously made by the plow I.

This arrangement of a subsoil-plow with a common plow avoids the necessity of the off horse walking over the loosened bottom of the furrow or in a very deep furrow, as in subsoiling in the common way, because the following plow fills the subsoiled furrow and provides a shallow furrow with a hard bottom for the said horse. It also avoids the tramping or packing of the loosened earth in the bottom of the furrow, common to the ordinary way.

The standards D are fitted on the axle B, so that they can be shifted endwise of the latter, and made fast by set-screws $d$, in order to shift the plows relatively to the wheels for shifting them relatively to the furrows.

Having thus described our invention, we claim as new and desire to secure by Letters Patent—

The combination of the vertically-adjustable plow-standard K, eccentrically-slotted elbow-lever N, and stud-pin P, substantially as specified.

CHRISTIAN MYERS.
WILLIAM GUMMOW.

Witnesses:
WILLIAM FRASER,
DANIEL FARRELL.